July 4, 1961

R. M. MAGNUSON 2,990,665

ARTICLE FEEDING APPARATUS AND METHOD

Filed Aug. 6, 1956

INVENTOR.
ROY M. MAGNUSON

BY

ATTORNEY

July 4, 1961 — R. M. MAGNUSON — 2,990,665
ARTICLE FEEDING APPARATUS AND METHOD
Filed Aug. 6, 1956 — 8 Sheets-Sheet 2
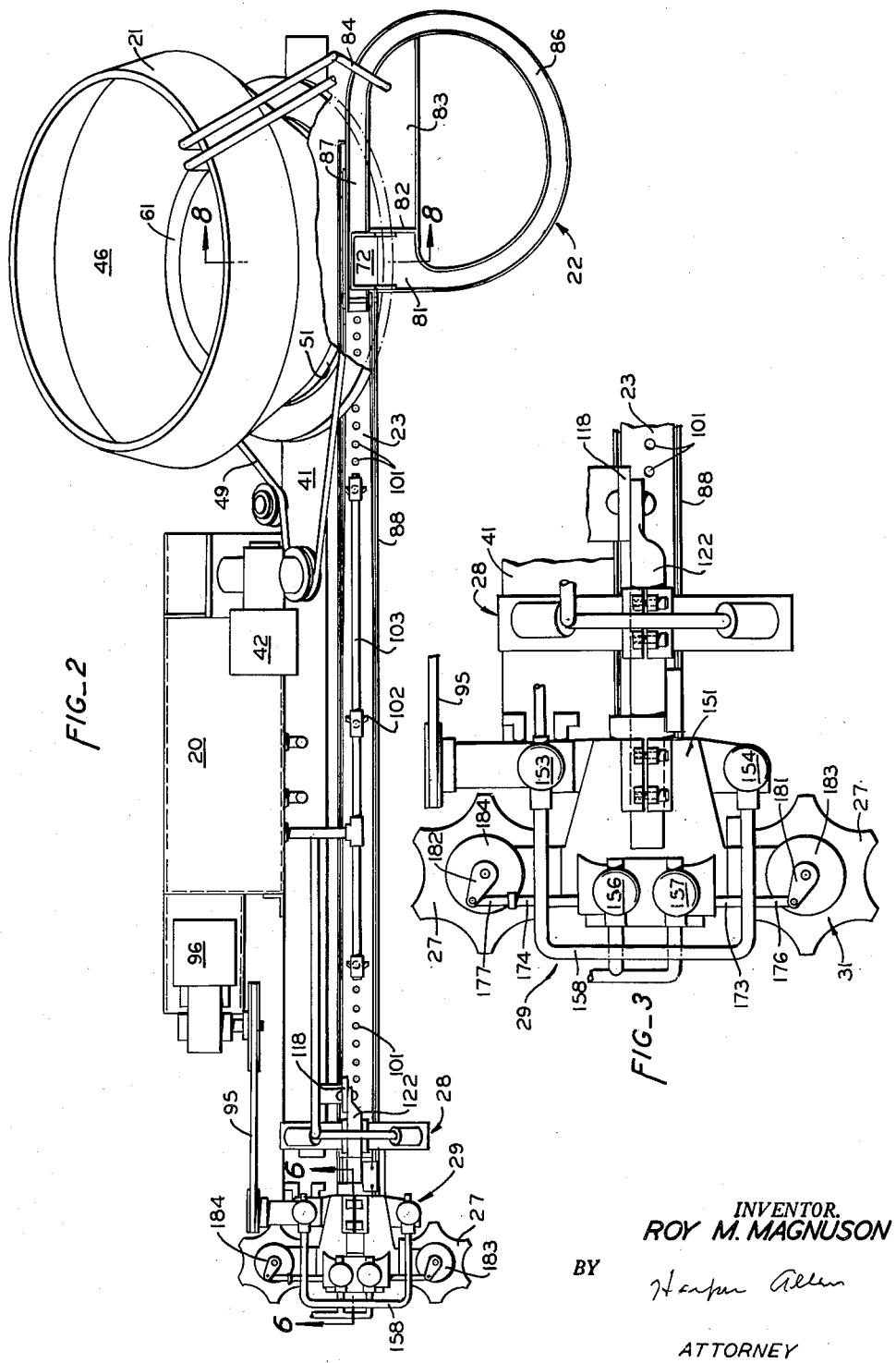
INVENTOR.
ROY M. MAGNUSON
BY
ATTORNEY

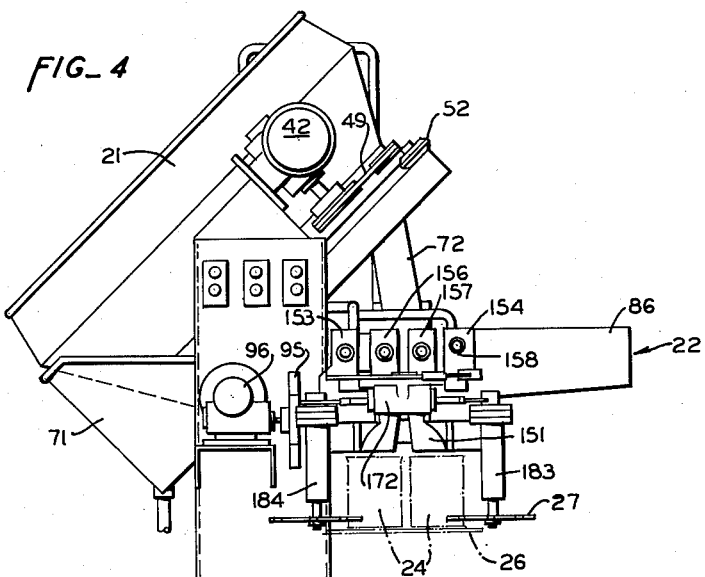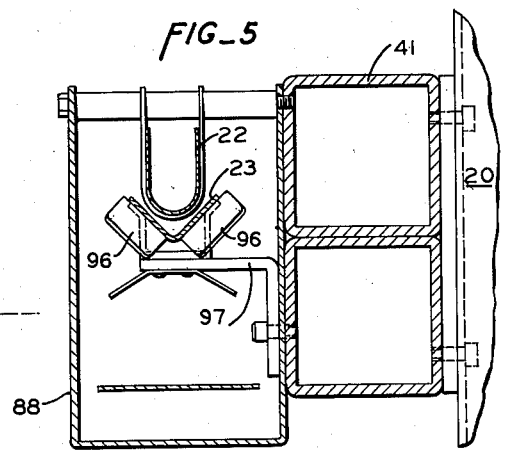

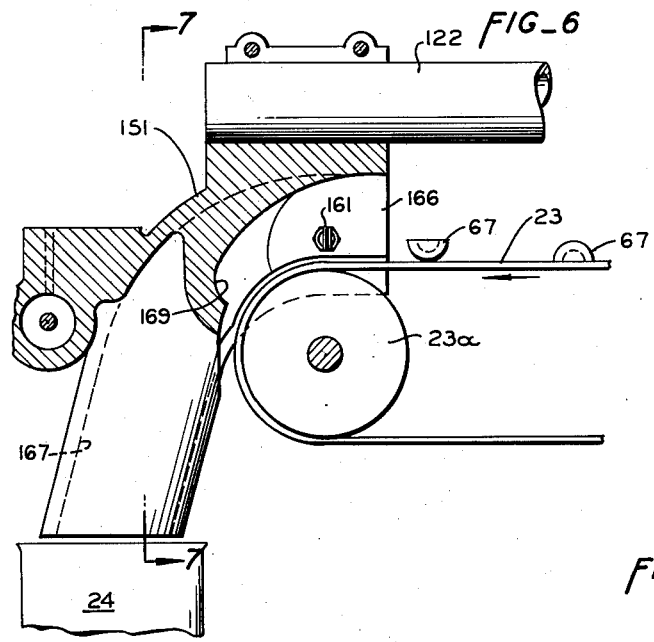
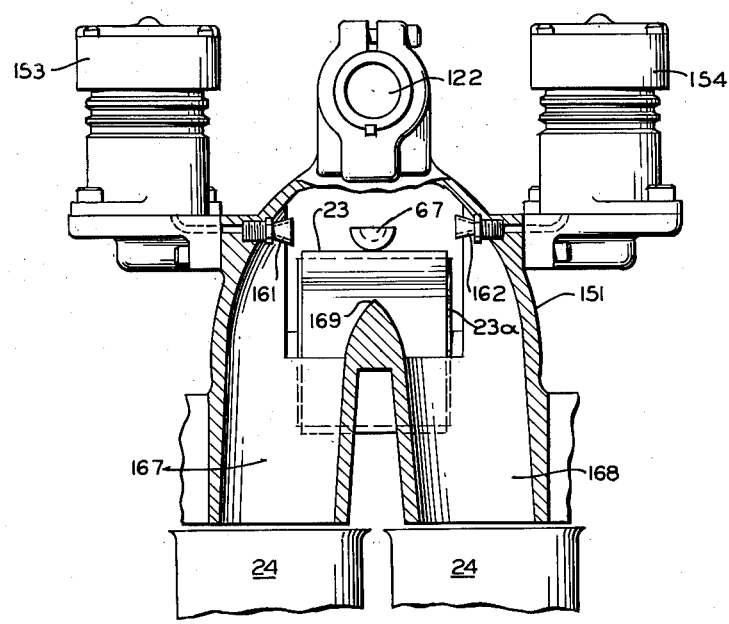

July 4, 1961 R. M. MAGNUSON 2,990,665
ARTICLE FEEDING APPARATUS AND METHOD
Filed Aug. 6, 1956 8 Sheets-Sheet 5
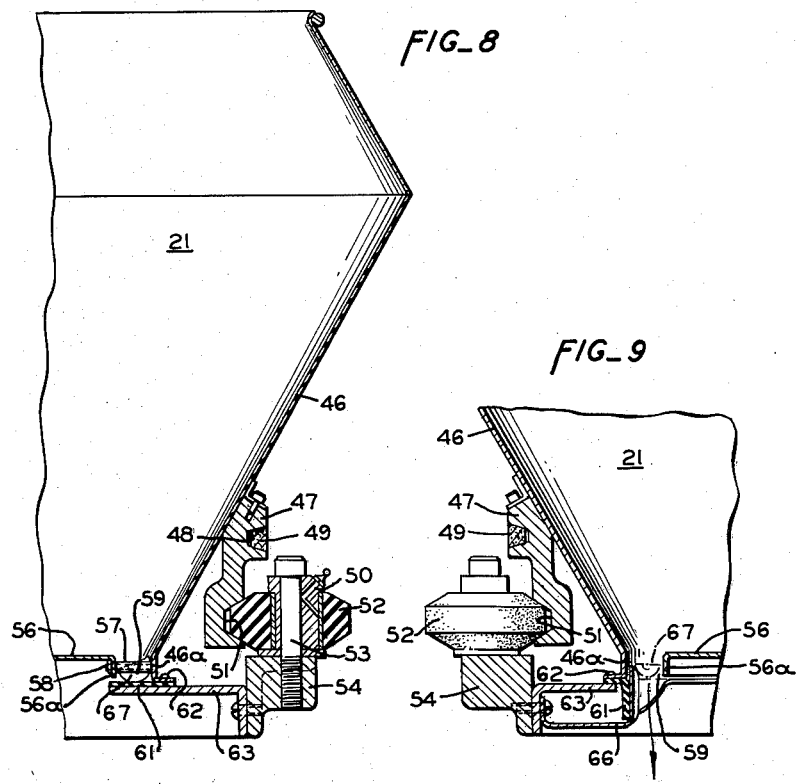
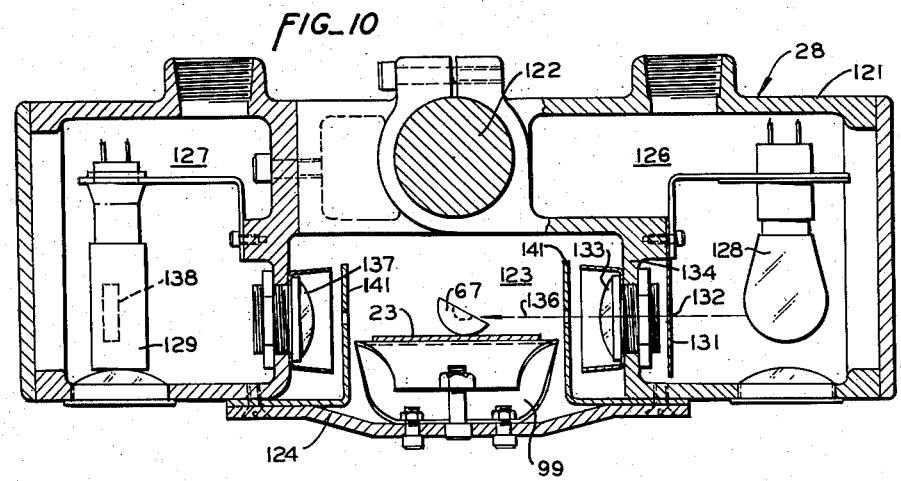
INVENTOR.
ROY M. MAGNUSON
BY
ATTORNEY

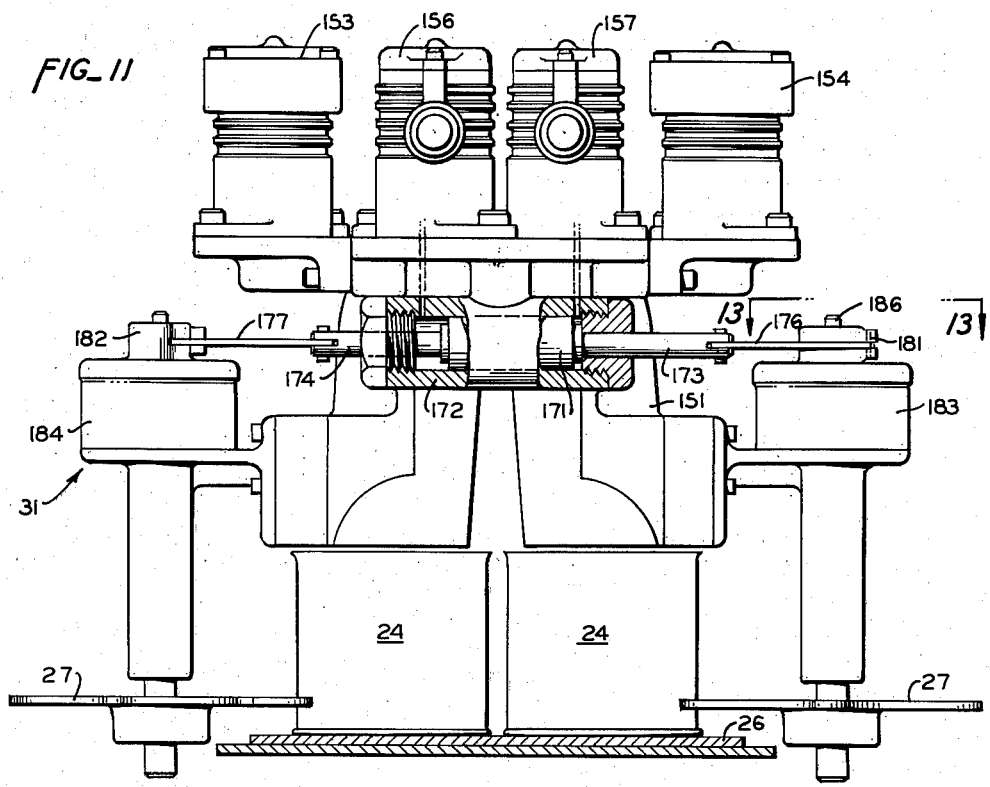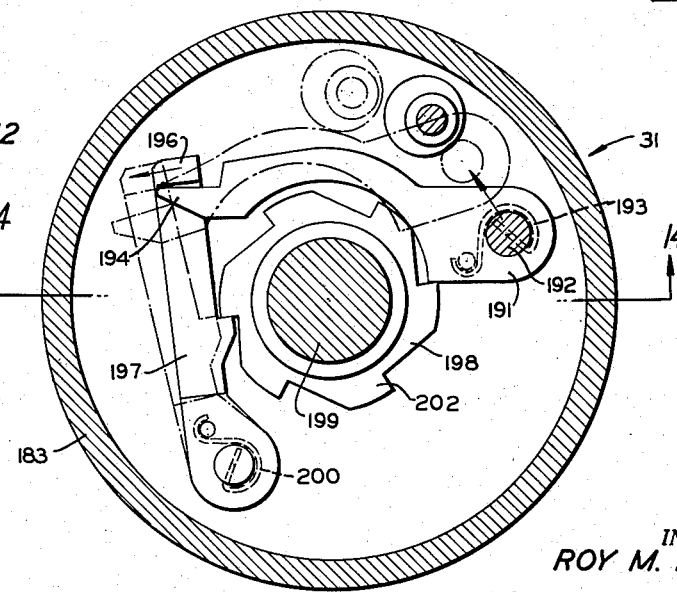

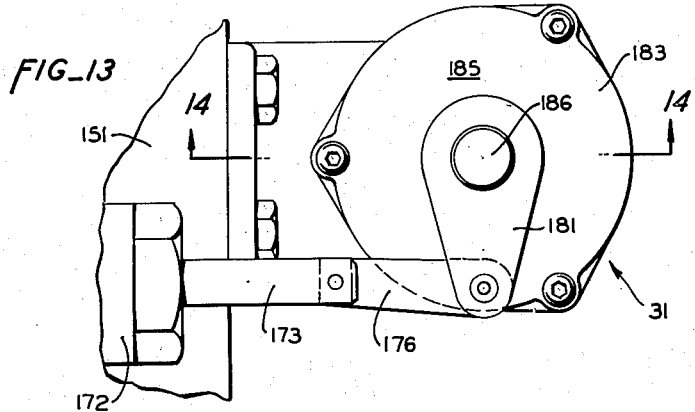
FIG_13
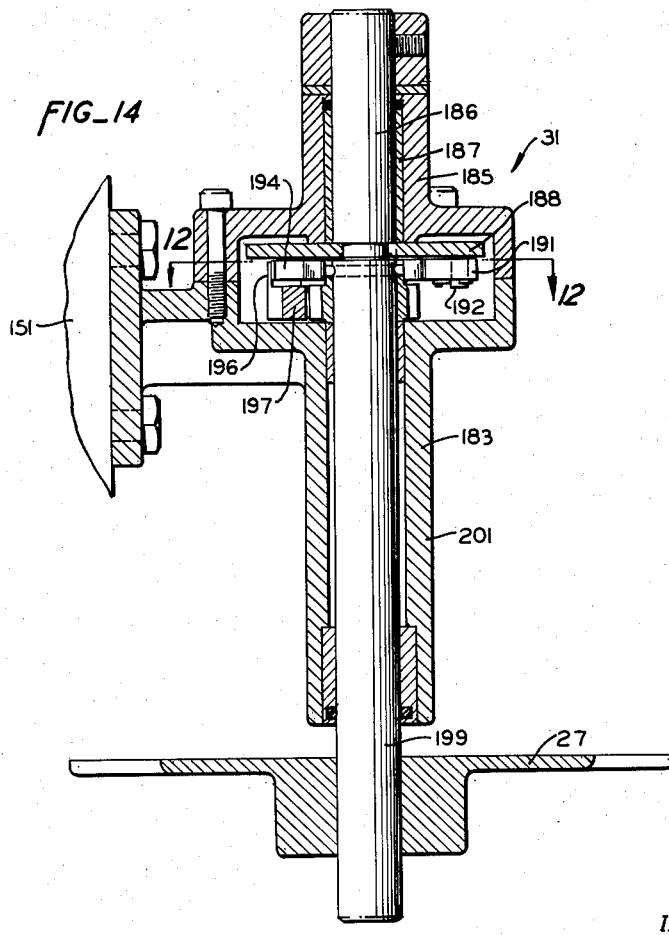
FIG_14
INVENTOR.
ROY M. MAGNUSON

July 4, 1961
R. M. MAGNUSON
2,990,665
ARTICLE FEEDING APPARATUS AND METHOD
Filed Aug. 6, 1956
8 Sheets-Sheet 8
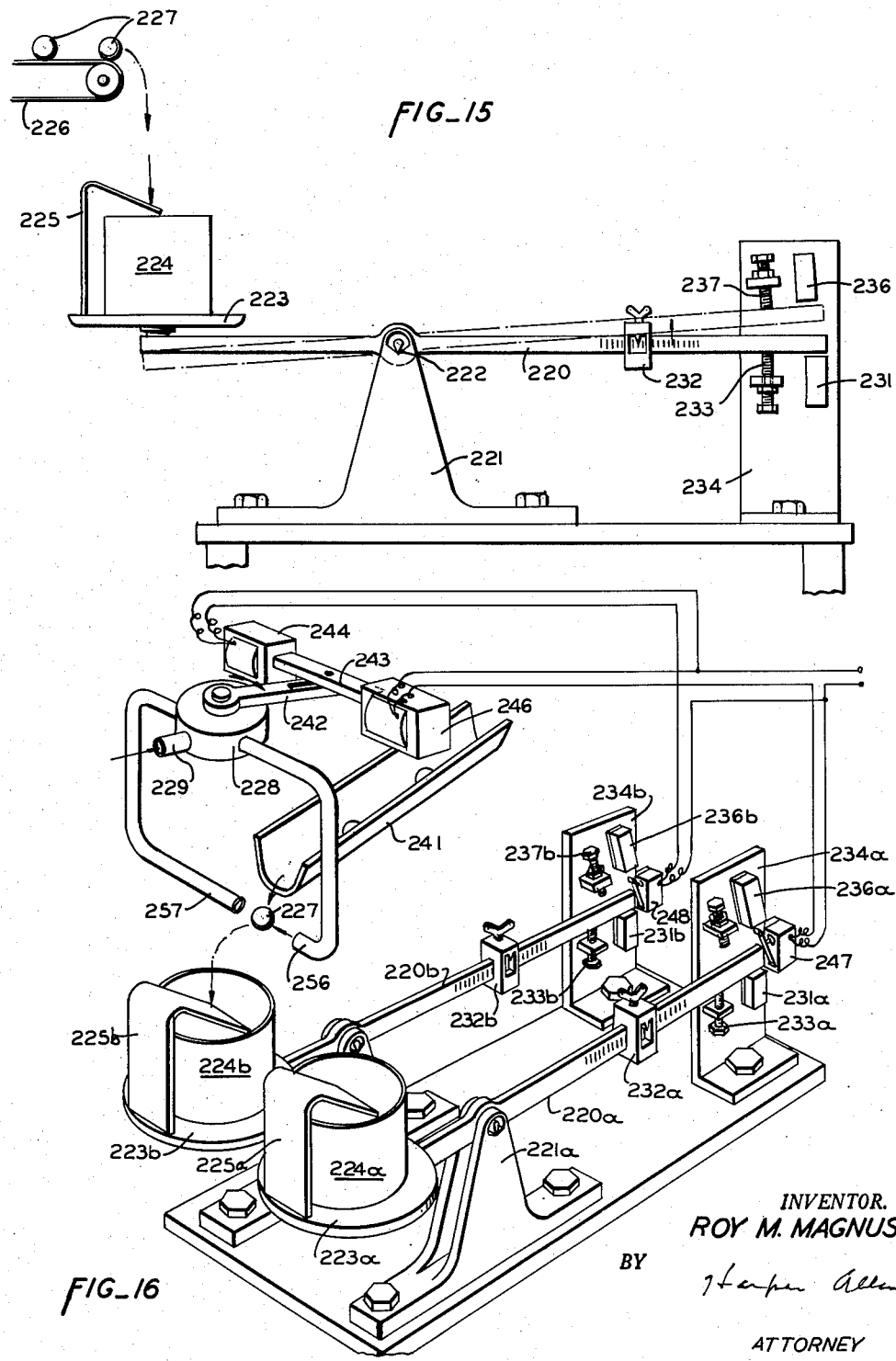
FIG_15
FIG_16
INVENTOR.
ROY M. MAGNUSON
BY
ATTORNEY United States Patent Office 2,990,665
Patented July 4, 1961

2,990,665
ARTICLE FEEDING APPARATUS AND METHOD
Roy M. Magnuson, 509 Emory St., San Jose, Calif.; Genevieve I. Magnuson, executrix of said Roy M. Magnuson, deceased, assignor of one-half to herself and one-half to Genevieve I. Magnuson, Robert Magnuson, and Lois J. Fox, as trustees
Filed Aug. 6, 1956, Ser. No. 602,355
6 Claims. (Cl. 53—35)

The present invention relates to the provision of measured quantities of articles, such as food articles, either by count or by weight, in which a single moving file of the articles is formed as an untimed progression, in which progressing file the articles have a random spacing, and in which subsequent filling of the articles one by one into a container takes place to provide a desired quantity in the container, either by count or by weight.

More particularly the invention is concerned with the feeding of articles of the above character and in the above manner in which the feeding and counting, either by unit or by weight, can be made regardless of differences in the articles of kind, shape, size, positioning, relative spacing in relation to each other, or weight.

It is a general object of the invention to provide improved apparatus and methods for segregating a definite quantity of articles.

Another general object of the invention is to provide methods and apparatus for supplying a counted number of articles to each container of an untimed intermittent flow of containers, where the moving of the container from article receiving position is controlled from the random feeding of articles to supply the desired quantity without reference to time.

Another general object of the invention is to provide improved methods and apparatus for filling articles into containers in which the articles are measured by weight by employing the impact effect as they are fed into the container.

A further general object of the invention is to provide improved methods and apparatus for filling articles into containers in which the articles are projected one by one through space for a fixed distance and at a standard or uniform velocity so that the impact and momentum effect on the container and its support by each article affords a measure of the weight of the article.

Another general object of the invention is to provide improved apparatus and methods for filling articles by count into containers in which the number of articles to be filled into a container can be varied.

Another general object of the invention is to provide a container filling operation in which the control of the filling operation is exerted entirely by the supply of articles moving at a variable rate of flow, so that the entire operation can be controlled or shut down by starving the flow of articles.

A still further general object of the invention is to provide methods and apparatus of the above character in which the object to be attained is the supply of containers with a given article or component therein to a synchronized operation, wherein there is no synchronization between the filling of the given article into the container and the flow of articles for filling into the containers, but wherein a variable accumulated excess of containers filled with articles is provided so that such a container is always available for the synchronized flow, but no requirements of synchronization are present in the actual flow of articles and containers to supply the variable accumulation.

Another object of the invention is to provide improved methods and apparatus for filling articles into containers by count in which the flow of both the articles and the containers are in a generally untimed relation and in which the average flow of articles and containers is above the rate required for a given number of containers per minute, but in which the articles and containers flow in untimed relation.

Another object of the invention is to provide improved methods and apparatus of selectively counting and discharging a desired number of articles in which a delay is incorporated between the sensing and discharge of an article.

Another object of the invention is to provide for feeding of articles one by one to one of a plurality of containers and affecting the article while it is in the air to determine the container into which it will be placed.

The above and other objects of the invention are attained as disclosed in the accompanying description, taken in connection with the attached drawings, in which:

FIGURES 1 through 14 illustrate one form of the invention.

FIGURE 1 is a side elevational view of apparatus for filling articles by count into a container.

FIGURE 2 is a plan view of the apparatus shown in FIGURE 1.

FIGURE 3 is an enlarged plan view similar to the discharge end of FIGURE 2.

FIGURE 4 is an end elevational view of the apparatus viewed from the left of FIGURE 2.

FIGURE 5 is a sectional elevation taken in a plane indicated by the line 5—5 in FIGURE 1.

FIGURE 6 is a vertical sectional view taken as indicated by the line 6—6 in FIGURE 2.

FIGURE 7 is a sectional view taken in a plane indicated by the line 7—7 in FIGURE 6.

FIGURE 8 is a fragmentary sectional view of the feed hopper taken in a plane indicated by the line 8—8 in FIGURE 2.

FIGURE 9 is a fragmentary sectional view generally similar to FIGURE 7, being taken at the point of discharge of articles from the hopper.

FIGURE 10 is a sectional view adjacent to the discharge end of the apparatus, the view being taken as indicated by the line 10—10 in FIGURE 1, and illustrating the relation of the light source and phototube to the article being sensed thereby.

FIGURE 11 is an end elevational view of the discharge end of the machine illustrating the relation of the solenoid valves to the container feed means.

FIGURE 12 is a horizontal sectional view taken as indicated by line 12—12 in FIGURE 14.

FIGURE 13 is a plan view indicated generally by the line 13—13 in FIGURE 11 and showing one of the container feed means.

FIGURE 14 is a sectional view through a container feed means as indicated by the line 14—14 in FIGURE 13.

FIGURES 15 and 16 illustrate a second modified form of the invention in which the desired quantity of articles to be filled is determined by the weight of the articles.

FIGURE 15 is a schematic view of one form of impact or momentum weighing mechanism.

FIGURE 16 is a schematic perspective view of another form of impact weighing mechanism.

Figure 1:
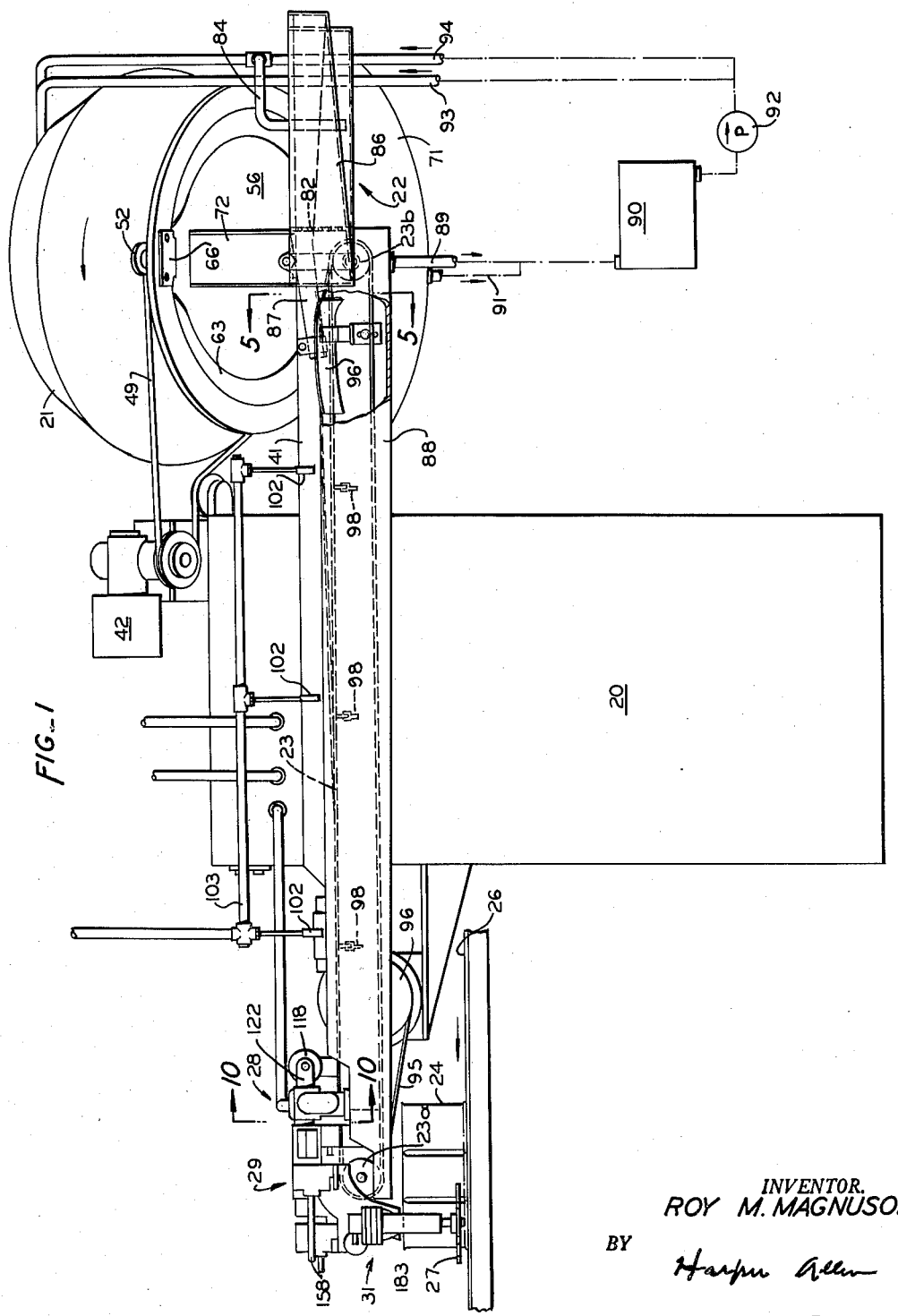

In the art of filling articles by count into containers such as cans for example, previous attempts to solve this problem have been directed universally along the line of obtaining a timed flow of containers and delivering a timed flow of articles to the containers, the exact control of timing being relied upon to insure accuracy. The present invention provides an untimed flow of articles and an untimed flow of containers in controlled fashion so that at any time the operation is interrupted it will stop and when restarted will pick up again at the same point. This control is obtained by making an exact count of the articles into a container with the articles in random spaced single file relation, and effecting the discharge of the container only after it has received the desired count.

More generally the count can be performed by actual counting of the articles or by counting the weight of the article until a desired minimum weight is reached in the container.

By employing a plurality of containers and by first feeding articles into a single container, and then diverting the flow from this first container to a second container when a desired count has been reached, desirable results are obtained in relieving the mechanical means for feeding the containers from the time requirements due to the rapidity of the feeding of articles. Preferably the directing of the articles into a given container is effected by a fluid jet such as an air jet.

Referring first to the modification shown in FIGURES 1 through 14, the apparatus will be described as employed in the feeding of a counted number of cherry halves into a can, an operation commonly performed in the packing of fruit cocktail, for example.

Referring first to FIGURES 1, 2 and 4, the apparatus includes a base 20, which may be in the form of a cabinet for housing various control elements, and on this base 20 there is mounted a rotary feed hopper 21 into which a supply of cherry halves is placed. The feed hopper 21 discharges cherry halves in substantially a single file onto a conveying system including a single filing chute 22, and a conveyor 23 both of which serve to further singulate the half cherries. Adjacent the discharge end of the feed belt 23 there are provided two parallel files of containers or cans 24 supported upon a constantly operating belt type conveyor 26, each file being restrained by a star wheel 27. Positioned adjacent the discharge end of the belt 23 is a sensing or phototube unit 28 having means for passing a light ray across the belt so as to be interrupted by the half cherries. This phototube unit 28 supplies the electrical impulse to a suitable counting circuit housed in the cabinet 20. This counting circuit may be of any suitable type, such as a solenoid operated mechanical counter, but is preferably of the electronic type disclosed in the co-pending application of Tyson G. Cowan, Patent No. 2,870,585, dated January 27, 1959, for Control Circuit for Filling of Containers.

Also adjacent the discharge end of the conveyor 23 is an air jet unit 29 which preferably includes opposed air jets, one of which is always operative and the other inoperative, with the operative and inoperative conditions thereof reversed at the end of a desired count so that half cherries are fed first to a can in one file and then are diverted by the other air jet to a can in the other file.

At the time the count is concluded the container feed means 31 is operated from the counter to release the can into which cherry halves have been fed and to restrain the next succeeding can.

With the above general operation and arrangement of the parts in mind, the various parts will now be described in detail.

Feed hopper

Referring to FIGURES 1, 2, 4, 8, and 9, the single file means includes a rotary feed hopper 21 which is suitably mounted in a manner later described on a longitudinal frame or support member 41 attached to the base 20. The hopper 21 is driven from an electric motor 42 which is also supported on the base 20. As previously described, a discharge means in the form of a chute 22 is associated with the discharge point of the hopper.

The rotary hopper 21 (FIGURES 8 and 9) includes an annular inwardly and downwardly converging side wall 46 secured at its periphery to an annular casting 47 having an annular recess 48 to receive a drive belt 49 from the motor 42. The casting 47 also has a second annular recess 51 for engagement with spaced resilient support rollers 52, each of which is journaled on an eccentric bushing 50 secured by a stud 53 on an annular frame piece 54 which is of general angle shape. By varying the positions of the rollers 52 by employing the eccentric bushings 50 the rollers 52 can be properly spaced with respect to the hopper 21.

The rotary feed hopper 21 in addition to the annular side wall 46 is provided with a rotary bottom wall 56 which is supported from the side wall 46 by a plurality of spacers 57 which are secured in place by studs 58 which pass through a down turned peripheral edge portion 56a of the bottom wall 56 and a parallel peripheral bottom edge portion 46a of the side wall 46. The annular recess 59 defined by the bottom and side walls is open at the bottom insofar as the walls are concerned but is closed by an annular sheet or strip 61 of flexible material, such as rubber, secured at 62 to the wall edge portion 46a.

The flexible bottom closure comprising the annular rubber strip 61 is held normally in recess closing position by an annular plate 63 secured within the frame member 54. At the point of discharge of cherries or other articles the plate 63 is cut away as shown in FIGURE 9 and an angle shaped control plate 66 engages the rubber closure 61 and bends it downwardly to open the bottom of the recess. This occurs at approximately the highest point of travel.

As seen in FIGURES 1 and 4 the bottom portion of the feed hopper 21 is encompassed by a pan or trough 71 which is mounted on the frame member 41 and contains liquid, usually water, so that a level of liquid is provided within the hopper 21 to provide a water dump for delicate articles.

To prevent overfilling of the annular trough formed by the recess 59 and its closure 61, suitable nozzle means may be employed as disclosed in my co-pending application No. 532,675, filed September 6, 1955, now abandoned, for Single File Hopper and Method.

In operation of the hopper and with the hopper traveling in the direction of the arrow in FIGURE 1 the half cherries tend to climb with the upwardly moving surface of the bowl, and those within the annular recess 59 continue upwardly past any sweeping means which may be employed. This results in substantially a single file of articles reaching the discharge point shown in FIGURE 9 where a half cherry is indicated at 67 as ready to fall through the opening into a discharge chute 72.

In this way the continuous flow of articles can be attained, which articles are substantially in a single file relation, with a minimum of relative movement between the articles and the single filing means.

Single filing conveying system

As described in the preceding section a continuous substantially single file arrangement of articles such as half-cherries is fed from the feed hopper through the discharge chute 72, and means are provided for receiving this substantially continuous flow in substantially single file and for further establishing a definite single file in the event of overlapping or piling up of articles, and for insuring a separation between adjacent articles at least insofar as placing them in a single file relation is concerned.

For this purpose the circular chute or flume 22 previously referred to is provided, this chute providing an ascending path of travel for the cherry halves and the liquid carrying them until it discharges onto the single file conveyor 23. The discharge chute 72 leads into a cherry feed portion 81 of the flume immediately adjacent a perforated wall 82 separating the cherry feed portion 81 from a water feed portion 83 into which a water feed pipe 84 discharges. The flow of water from the pipe 84 into the feed portion 81 continues around a curved trough or flume 86 on a constantly ascending path, leading to an elevated discharge portion 87 at which place the singulated cherries and the water are discharged onto the single file conveyor 23, this conveyor being suitably perforated at the center to discharge water therethrough. The level of water in the flume 86 gradually decreases, as the flow of water accelerates until it arrives at the discharge portion 87 where the depth of the water is insufficient to allow passage of two superposed cherry halves. This in effect completes the singulating operation on the cherry halves.

Associated with the flume 22 is the single file feed belt 23 previously referred to and this belt is trained about a driving drum 23a (FIGURE 1) at its discharge end and an idler drum 23b at its feed end, suitably journaled on the frame member 41. The driving drum 88 (FIGURE 2) is driven through a belt and pulley mechanism 95 from a variable speed motor 96 of conventional construction.

The belt 23 is positioned in a drain trough 88 supported on the frame member 41 and having its lowest end at the right of FIGURE 1 from which a drain pipe 89 leads to a reservoir 90. The drain pipe 91 from the trough 71 discharges into this reservoir. A suitable impelling pump 92 withdraws liquid from the reservoir and supplies it to the pipes 93 and 94.

The belt 23 (FIGURE 1) receives a centrally positioned stream of water and cherries from the flume 22 and is driven at a relatively fast rate, faster than the rate of travel of the water and cherries out of the flume 22. This V-shaped configuration of the belt 23 is provided by opposite angled support members 96 (FIGURES 1 and 5) carried by a frame angle 97. The V-shaped arrangement of the upper stretch of the belt 23 is gradually decreased as the belt passes over resilient wiper members 98. As the belt 23 passes over a resilient support plate 99 (FIGURE 10) it arrives at a substantially flat configuration. The members 98 serve to wipe water from the bottom surface of the belt 23 as it drains through central perforations 101. A plurality of downwardly directed air jets are provided by a series of nozzles 102 depending from an air supply pipe 103. Each nozzle 102 is immediately adjacent and ahead of a wiper member 98.

The control of the discharge of the cherries from the belt 23 is controlled as described hereinafter.

*Phototube control unit*

As seen in FIGURES 1 and 10, the phototube control unit includes a housing or casting 121 which is suitably mounted on a shaft 122 carried by the frame member 41 and is provided with a center lower opening 123 to pass the belt 23. The shaft 122 has its end secured to a mounting casting 118 carried by the frame member 41. The connection to the casting 118 provides for movement of the entire assembly carried by the shaft 122 from the operative position shown to an elevated position for inspection and repair. Below the housing 121 the belt support 99 is carried by a strap 124 on the housing 121 to provide accurate positioning of the belt 23 with respect to the housing 121.

The housing 121 (FIGURE 10) provides opposite compartments 126 and 127 of water tight character in which a lamp 128 and a phototube 129 are mounted, respectively. Also within the compartment 126 a collimating plate 131 is mounted having an aperture 132 to pass a light ray from the lamp 128 through a lens 133 mounted in a wall 134 of the compartment 126. This lens 133 serves to provide a light ray of substantially parallel character for transmission across the opening 123 at a desired selected location which is approximately midway of the height of a half cherry on the belt. The light ray 136 is received by a second lens 137 suitably mounted in the wall of the compartment 127 and serves to focus the light ray onto the cathode 138 of the phototube 129. A pair of apertured shield plates 141 (FIGURE 10) are mounted on the housing 121 between the belt 23 and the respective lenses 133 and 137 to control splash of water and shield the lenses.

The compartment 127 also provides a mounting for a cathode follower tube so that the high impedance pulse from the phototube 129 is converted to a low impedance pulse for transmission to the circuit housed by the base casting 20.

The circuit controlled by the tube 129 is conventional in character and provides a pulse on the extinguishing of the light ray so that each half cherry which interrupts the light beam will provide a control pulse. The location of the light ray 136 with reference to the belt 23 is such that two half cherries having abutting portions will still allow the passage of a light beam because of the intermediate location of the light beam with respect to the cherry half whether cut side up or cut side down.

This control pulse is utilized to trip a cherry discharge or diverting means in the form of a fluid jet, such as an air jet, at a point further along the discharge path of the cherry, and the timing of the control pulse and the mechanism trip thereby is such that the control of the air jet is delayed an appropriate amount corresponding to the time required to travel the space between the light ray and the air jet.

*Product discharge*

As previously described, a belt conveyor 26 (FIGURES 1 and 10) provides parallel files of containers 24 such as cans, and in the embodiment shown, the endmost container of each file is in article receiving position.

This count of the pulses provided by the half cherries traveling along the conveyor 23 can either be received in a mechanical counter of suitable type which provides a control pulse, either mechanical or electrical, at the end of the desired count, or it can be controlled electronically in accordance with the disclosure of the previously-mentioned Cowan application.

As seen in FIGURES 1, 2, 6, 7, and 11, adjacent the discharge end of the single file conveyor 23, there is provided a discharge control casting 151 which is supported by the shaft 122, this casting 151 provides a mounting for respective sets of solenoid valves 153, 154, 156 and 157. The solenoids 153 and 154 serve to control the flow of air from an air manifold 158 to respective opposed air jet nozzles 161 and 162 which are mounted so that a cherry half as it is leaving the belt 23 will pass through an active air jet, and will be directed or fed into either one or the other of the cans 24. The condition of the solenoid valves 153 and 154 is controlled from the counting circuit or counting mechanism in accordance with the desired setting for the number of cherry halves desired in each can. At the end of the count of the desired number of cherries, the condition of the solenoid valves 153 and 154 will be reversed.

Referring to FIGURES 6 and 7, the casting 151 has a hollow entrance position or cavity 166 into which the discharge end of the single file conveyor 23 projects, and on the side walls of which the vertically extending fan-shaped nozzles 161 and 162 are mounted. To the left of the conveyor 23 as seen in FIGURE 7, the hollow portion 166 leads to two parallel discharge passages 167 and 168 (FIGURES 6 and 7) which are separated at their upper ends by a knife edge 169 which continues into the entrance cavity 166. In operation the air jet from the nozzle 161 blows a half cherry into the discharge passage 168 and thence downwardly into the related can 24; and in the same manner, when the nozzle 162 is active, its air jet blows a half cherry into the discharge passage 167 and through this passage to the related can. While the discharge passages are shown in side by side relation adjacent to the discharge end of the single file conveyor 23, it will be apparent that these passages could be separated and could be located at any decided position along conveyor belt to receive a laterally ejected half cherry therefrom. It will also be apparent that because the shutting off of the air jet from one nozzle is simultaneous with the turning on of the air jet from the other nozzle, and the fact that these nozzles are directly opposed, the enabled air jet in effect pushes back a remaining portion of the disabled air jet, i.e., that portion of air jet which remains after cut off, and thereby enhances the rapidity of change in the direction of discharge of the half cherry.

The same control or control pulse that reverses air solenoid valves 153 and 154 will also serve to reverse the water solenoid valves 156 and 157 and control the release of the can having the desired fill from the mechanism.

The control of the can release by valves 156 and 157 is selectively effected by feeding water under pressure to the opposed sides of a piston 171 (FIGURE 11) housed in a cylinder 172 formed integrally with the casting 151. This piston 171 has respective rods 173 and 174 projecting from its ends as seen in FIGURE 11 and connected by links 176 and 177 to respective arms 181 and 182 of respective escapement mechanisms 183 and 184. These mechanism are similar in construction and only one will be described.

Referring to FIGURES 11 through 14, the arm 181 is secured on a stub shaft 186 suitably journaled by a bushing 187 in the cover 185 of the housing 183 and carrying at its lower end a plate 188 within the housing 183. The plate 188 carries a release pawl 191 pivoted on a pin 192 and urged in a counterclockwise direction by a torsion spring 193 so that its nose 194 engages the upstanding end 196 of a latch pawl 197 for a ratchet wheel 198 secured on a shaft 199 journaled in an extension 201 of the housing 183 and carrying at its lower end a star wheel 27. The latch pawl 197 is urged against the wheel 198 by a spring 200. There is one tooth 202 for each of the six recesses in the star wheel 27 so that a one tooth advance on the ratchet 198 will release one can from the file being controlled and will correspondingly allow feeding of another can into cherry half receiving position. It will be understood that power for operating the star wheel 27 is derived from the belt 26 through a can 24. The actuation of the shaft 186 and the plate 188 is a reciprocatory one for each control impulse received so that the pawl 191 (FIGURE 12) will be advanced from its full line position to its dotted line position to operate the pawl 197 and then returned for each operation.

As a result of the above, one operation of the release mechanism releases one of the cans from the file and by virtue of the urgency of the oncoming cans beyond allows another can to move into filling position.

Hand feeding

Referring in particular to FIGURE 1, it will be appreciated that one or more operators could stand alongside the article conveyor or feed belt 23 and manually place half cherries thereon to form the random-spaced single file.

Operation

The modification shown in FIGURES 1 through 14 operates generally as follows:

Half cherries are placed in the rotating bowl 21 (FIGURES 1, 2 and 4), and with the rest of the parts in "On" condition, the half cherries are fed in substantially single file out of recess 59 (FIGURE 9) at the upper portion of its travel and fall down the chute 72 (FIGURES 1 and 2) into the flume 22. The water in the flume 22 progresses along a path of decreasing cross-section and accelerates to a point where the width and depth of the flume 22 are decreased to permit passage of only one half cherry. As the liquid and cherries flow down the discharge portion 82 the liquid is accelerated to space the half cherries apart. As the result a substantially single file of half cherries and water are discharged onto the conveyor 23 (FIGURES 1 and 5) where it is supported in substantially V-shaped fashion by the plates 96.

The perforations 101 (FIGURE 2) in the belt 23 serve to permit discharge of the water and tend to concentrate the half cherries in the center by virtue of the inward flow of water to these discharge perforations. Wipers 98 (FIGURE 1) and air jets from the nozzles 102 also assist in freeing the upper stretch of the belt 23 of water.

As a result of the above operations a single file of half cherries will approach the discharge zone of the belt 23 substantially in centered relation on the belt, and either cut side up or cut side down.

When a cherry interrupts the light beam (FIGURE 10) from the light source 128, the phototube 129 produces a control signal or pulse, and this control signal is fed to a counting circuit housed within the base 20, which can be pre-adjusted to count the desired number of articles. Preferably this counting circuit would be of the type shown in the above-mentioned Cowan application, but also a solenoid operated mechanical counter can be employed to provide an electrical control signal when the required count is reached. Preferably such counting means is settable as to the number of units to be counted and when the required number is reached, a control signal is transmitted through suitable electrical connections to the solenoid valves 153 and 156, for example, and the opposite pair of solenoid valves 154 and 157 will be de-energized. With respect to the solenoid valve 153, as shown in FIGURE 7, this valve when energized will cause an air jet to be issued through the nozzle 161 to impinge upon a half cherry as it passes thereby and will blow this half cherry off into the discharge chute or conduit 168 and thence into the related can or container. This operation of course comes as a memory incorporated in the control system as the light ray is spaced ahead with respect to the direction of travel of the belt than the nozzles 161 and 162. This memory delay must be adjusted in accordance with the speed of the belt 23 which is controlled by the variable speed motor 96, and the spacing apart of the light ray and the air jets.

At the same time that the solenoid 153 was activated, the solenoid 156 is also activated to move the piston 171 (FIGURE 11) to the position there shown which will effect a one can release under the control of the star wheel 27.

The above conditions obtain until the next subsequent counting operation is completed when the reverse operations with respect to the solenoid valves 153, 154, 156 and 157 will occur.

In general, with respect to the method described above, it will be noted that counting of the articles fed by the belt 23 is a principal controlling factor in the operation, and that a can will not be released until it receives the proper count of articles. In other words, if the machine is set to count four half cherries to a can and three half cherries have been fed into the can when it is shut off, when the operation is again resumed, the first operation is to feed the fourth half cherry into the partly-filled can and then continue as above. Also, it will be noted that by starving the feed of cherries to the equipment, the operation of the equipment can be slowed down.

It should be noted also that the invention provides for an untimed flow of both the articles and the containers, so that in combining this equipment with a conventional timed canning operation it is necessary to meet the demand of a certain number of cans per minute of this conventional canning equipment. This demand is met by accumulating the filled discharged cans from this equipment, and controlling the number of filled cans accumulated.

Counting by weight

In the modification of the invention illustrated schematically in FIGURES 15 and 16 adaptable particularly to the weight filling the food products where the individual units are of appreciable weight and size so as to individually affect the filling of a container to desired weight, the fill of an exact number of units to achieve a desired net weight without any excess fill of a unit is effected. In such operations the filling sequence contemplates the rough under-filling of the container with an amount of the product known to be less than the desired weight, then effecting a unit-by-unit fill of the product until it exceeds the desired weight by less than the weight of one unit. In conventional methods for this type of operation it has been necessary to let the weighing mechanism come to rest between each successive weighing operation in order to obtain an exact weight of the product. In accordance with this invention the factor of momentum is employed, and each individual unit has imparted thereto a desired uniform or standard velocity in a given direction so that when it impacts the container support, its momentum is employed as a measure of its mass, whose effect will be substantially larger than that of the mass alone. This results in reducing the overall sensitivity of the apparatus to measure to a given accuracy. Preferably restraining means are associated with the weighing member so that it will remain in its initial position of rest until the desired weight filling or counting of the product by weight is obtained.

Referring to FIGURE 15, in particular, the apparatus includes a weight arm 220 which is pivotally mounted on its bracket support 221 by a knife edge support 222. At one end this balance arm is provided with a platform 223 to receive a container 224 and preferably the container 224 is spaced sufficiently below the point of feed, illustrated as conveyor 226, to provide the desired velocity of an article at the time it reaches a rigid impact blade 225 secured to the platform 223 and overlying and discharging into the container 224. Any suitable means may be provided in connection with the conveyor 226 to provide a unit-by-unit feed of the articles 227, such as for example, the feed belt 23 and associated components heretofore described.

The other end of the balance arm 220 has associated therewith a lower permanent magnet 231 which holds it in its normal rest position and an adjustable weight 232 for adjusting the weight of the products to be measured. The magnet 231 holds the arm 220 in engagement with adjustable stop 233 carried with the magnet 231 and a bracket 234. Spaced above the arm is a second permanent magnet 236 for holding the arm elevated once the desired weight relation is obtained, the arm being stopped by the upper stop 237.

The above apparatus illustrates schematically the method employed in this modification whereby the number of units can be counted into a container by measuring the total mass thereof, the actual weight effect of any given unit being felt by measuring its momentum.

FIGURE 16 illustrates a further modified form of the apparatus in which the two scale members 220a and 220b are provided in association with a unit by unit feed in the form of a trough 241 which is symmetrically arranged with respect to the two containers 224a and 224b resting on the platforms 223a and 223b.

Also associated with the trough 241 and the containers 224a and 224b are a pair of air nozzles 256 and 257 which are adapted to receive air from an intake pipe 229. In normal operation only one of the air jets is effective as shown by the arrow in FIGURE 16, and this air jet from the nozzle 226 will deliver articles to the container 224b. It will be noted that the lateral movement of an article accomplished by the air jet 226 will not affect its gravity fall but merely relates to the direction of fall.

The valve 228 is controlled by a slotted arm 242 connected to a slidable armature 243 for a pair of opposed solenoids 244 and 246. These solenoids are connected in suitable electric circuit with respective switches 247 and 248 having their switch arms lying respectively in the path of movement of balance levers 220a and 220b, respectively.

Thus when a container counts by weight to the desired fill, an associated switch controls the energization of the appropriate solenoid to change the direction of the air jet and cause subsequent units to be placed in the other of the two containers.

In the above description it should be understood that the word "containers" is used broadly and not only refers to articles ordinarily known as containers such as boxes, bottles and cans, but refers to any receptacle wherein it would be desired to place a given desired amount of articles, either of the same kind, or a mixture, and wherein the measuring of the articles is done by counting either by units or by weight.

While I have shown and described certain preferred embodiments of apparatus, and certain preferred methods of carrying out my invention, it will be apparent that the invention is capable of variation and modification from the forms and procedures disclosed, so that the scope thereof should be limited only by the proper scope of the claims appended hereto.

I claim:

1. The method of feeding predetermined selected quantities of articles and containers in which all the articles in the feed line are placed in containers and in which the articles are indiscriminately spaced in relation with respect to each other and in untimed relation with respect to each other in the feed line, which comprises providing a supply of containers with at least one of said containers in an article receiving station, normally retaining said one container at said station, feeding a measured quantity of a single file of indiscriminately spaced articles in linear array into a container by establishing a fluid jet directed to impinge upon successive articles in said path.

2. The method of filling articles into containers which comprises establishing a single file flow of articles in linear array along a path, establishing a plurality of files of containers, with at least one container of each file at an article receiving position, the respective article receiving positions of a pair of said files being on opposite sides of said path, said path having respective opposite discharge locations adjacent said respective article receiving positions, feeding articles from said flow into one container of a first file until a desired quantity of articles is placed in the container by establishing an article feeding fluid jet at one of said discharge locations, thereafter interrupting said feeding, and then feeding articles from the flow to said one container of said second file of containers by establishing a second article feeding fluid jet at another of said discharge locations.

3. In an apparatus for feeding articles into containers, a frame, means for feeding articles in single file along a path to a discharge zone including a pair of opposite discharge points, opposite fluid jet means on respective opposite sides of said discharge zone for diverting articles to respective discharge points, and selectively operable means for controlling said jets to place them in operation alternately.

4. In an apparatus for arranging articles into segregated groups, with an exact count of the articles in each group, irrespective of the timed and spaced relationship of the articles before grouping, a frame, means defining a path leading along said frame, means for causing articles to travel along said path, means for counting articles moving along said path, and means under control of said counting means for changing the direction of travel of articles in said path to place said articles in the groups of a predetermined number comprising means for forming opposed air jets, said respective air jet means being selectively controlled by said counting means.

5. In an apparatus for feeding articles into containers, a frame, an article conveyor mounted on said frame and leading from a feed zone for feeding of articles thereto in indiscriminately spaced single file relation thereon to a discharge zone including a plurality of discharge points, conveyor means for supporting a plurality of files of containers disposed adjacent said article conveyor and extending adjacent said discharge zone, means individual to each file of containers for causing feeding movement of containers by said conveyor means, diverting means at each said discharge point comprising means for forming a fluid jet for discharging articles from said article conveyor into a container of one of said files, a solenoid valve for controlling said jet forming means, counting means controlled by articles on said conveyor for controlling said diverting means, said counting means including means for providing an electrical signal for operating said solenoid valve, and means for controlling said container feeding movement causing means under control of said counting means.

6. In an apparatus for feeding articles into containers, a frame, an article conveyor mounted on said frame and leading from a feed zone for feeding of articles thereto in indiscriminately spaced single file relation thereon to a discharge zone including a plurality of discharge points, conveyor means for supporting a plurality of files of containers disposed adjacent said article conveyor and extending adjacent said discharge zone, means individual to each file of containers for causing feeding movement of containers by said conveyor means, diverting means at each said discharge point comprising means for forming a fluid jet for discharging articles from said article conveyor into a container of one of said files, counting means controlled by articles on said conveyor for controlling said diverting means, a discharge chute located adjacent said article conveyor to receive an article displaced from said conveyor by said air jet and also leading to a container, and means for controlling said container feeding movement causing means under control of said counting means.

References Cited in the file of this patent

UNITED STATES PATENTS

| | | |
|---|---|---|
| 1,959,238 | Horsfield | May 15, 1934 |
| 2,204,126 | Domke | June 11, 1940 |
| 2,439,697 | Scott | Apr. 13, 1948 |
| 2,502,779 | Coons | Apr. 4, 1950 |
| 2,515,965 | Nurnberg | July 18, 1950 |
| 2,523,517 | Potter | Sept. 26, 1950 |
| 2,536,516 | Peterson | Jan. 2, 1951 |
| 2,572,773 | Slagle | Oct. 23, 1951 |
| 2,594,337 | Noe | Apr. 29, 1952 |
| 2,620,091 | Thompson | Dec. 2, 1952 |
| 2,632,588 | Hoar | Mar. 24, 1953 |
| 2,713,409 | Bartlett | July 19, 1955 |
| 2,763,108 | Garrett | Sept. 18, 1956 |